(12) United States Patent
Shimizu

(10) Patent No.: US 8,810,681 B2
(45) Date of Patent: Aug. 19, 2014

(54) IMAGE PROCESSING APPARATUS AND IMAGE PROCESSING METHOD

(75) Inventor: Yusuke Shimizu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 157 days.

(21) Appl. No.: 13/596,793

(22) Filed: Aug. 28, 2012

(65) Prior Publication Data

US 2013/0057726 A1    Mar. 7, 2013

(30) Foreign Application Priority Data

Sep. 7, 2011   (JP) .................................. 2011-195254

(51) Int. Cl.
*H04N 9/73* (2006.01)

(52) U.S. Cl.
USPC ...................................................... 348/223.1

(58) Field of Classification Search
CPC ................. H04N 9/73; H04N 9/735
USPC .......................................... 348/223.1–225.1
See application file for complete search history.

(56) References Cited

U.S. PATENT DOCUMENTS

| | | | |
|---|---|---|---|
| 2003/0011686 A1* | 1/2003 | Higuchi | 348/223.1 |
| 2004/0233298 A1 | 11/2004 | Aotsuka | |
| 2006/0284991 A1* | 12/2006 | Ikeda | 348/223.1 |
| 2007/0268379 A1* | 11/2007 | Suzuki et al. | 348/224.1 |
| 2008/0211925 A1 | 9/2008 | Misawa et al. | |
| 2011/0205392 A1 | 8/2011 | Yokoi | |
| 2012/0008009 A1 | 1/2012 | Ito et al. | |
| 2012/0057045 A1 | 3/2012 | Shimizu | |

FOREIGN PATENT DOCUMENTS

JP        2000-212641 A    8/2000
JP        3540485 B2       7/2004

OTHER PUBLICATIONS

U.S. Appl. No. 13/596,797, filed Aug. 28, 2012, Kenji Ouchi.
U.S. Appl. No. 13/596,803, filed Aug. 28, 2012, Masahiro Takayama.

* cited by examiner

*Primary Examiner* — Timothy J Henn
(74) *Attorney, Agent, or Firm* — Canon USA Inc IP Division

(57) ABSTRACT

An image processing apparatus determines a first white balance correction value corresponding to a first light source and a second white balance correction value corresponding to a second light source, determines a third white balance correction value by using a correction amount corresponding to a predetermined region detected in captured image data, and combines first image data determined based on the first white balance correction value and second image data generated based on the third white balance correction value.

18 Claims, 14 Drawing Sheets

FIG. 4
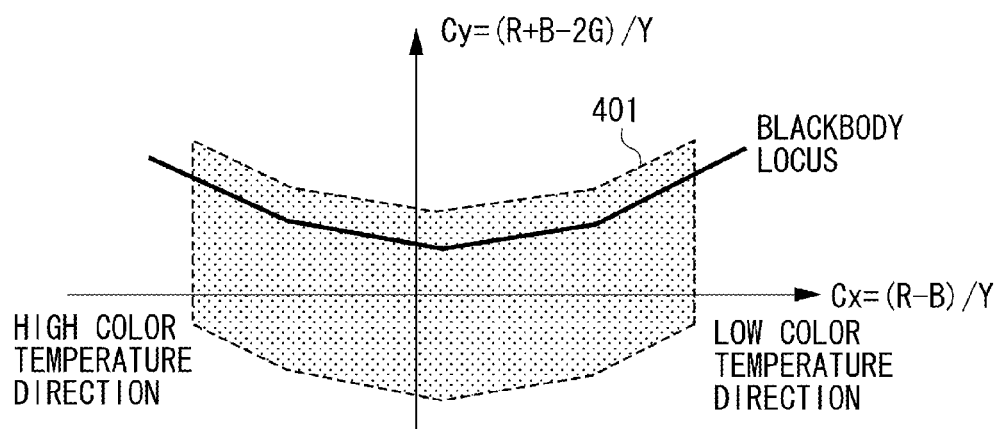
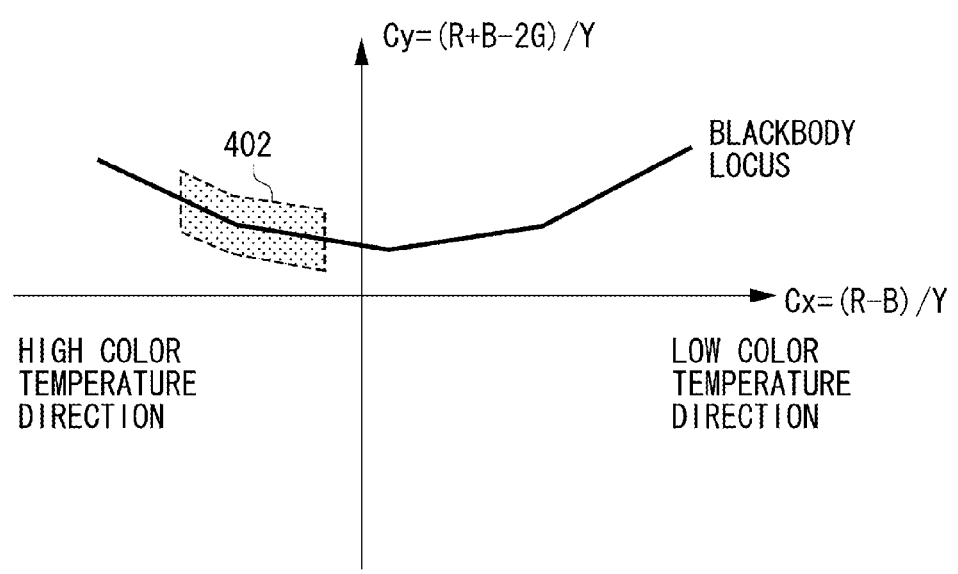

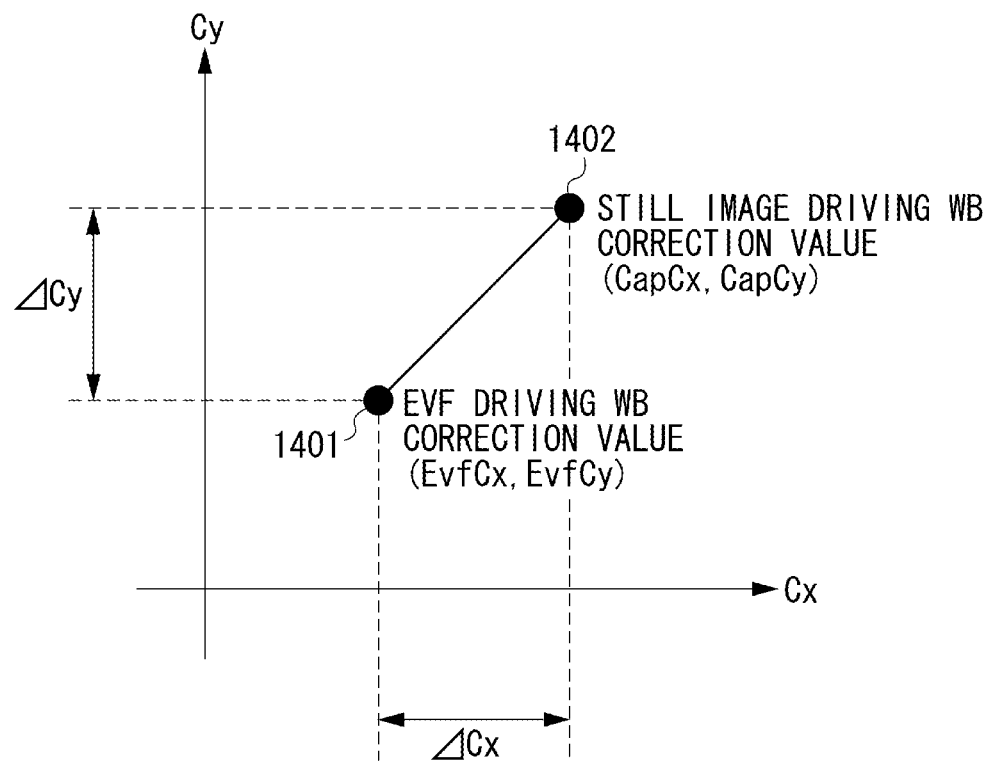

IMAGE PROCESSING APPARATUS AND IMAGE PROCESSING METHOD

BACKGROUND OF THE INVENTION

1. Field of the Invention

The present invention relates to a white balance control technology for image data.

2. Description of the Related Art

An imaging apparatus that uses an image sensor such as a digital camera or a digital video camera has a white balance control function of adjusting a color tone of image data acquired by photographing. The white balance control is classified into manual white balance control and automatic white balance control. The manual white balance control is for first imaging a white object to calculate a white balance coefficient, and then applying the calculated white balance coefficient to the entire screen. The automatic white balance control is for automatically detecting a portion likely to be white from the captured image data, calculating a white balance coefficient from an average value among color components of the entire screen, and then applying the calculated white balance coefficient to the entire screen.

In conventional automatic white balance control, when a light source different from that of flash light is present in image data in a flash light emission scene, white balance control is carried out by applying the white balance coefficient calculated as described above to the entire screen. It has, therefore, been difficult to carry out white balance control for achieving appropriate colors for the respective light sources. For example, when a low color temperature light source such as an incandescent light bulb is present as ambient light in the flash light emission scene, flash light is from a high color temperature light source. Thus, when white balance is matched with the flash light, the white balance is not matched with the low color temperature light source. On the other hand, when the white balance is matched with the low color temperature light source, the white balance is not matched with the flash light. Even when white balance control is carried out by setting white balance between both light sources, the white balance is matched with neither of both light sources. Accordingly, a region irradiated with the flash light is bluish, and a region irradiated with light from the low color temperature light source is reddish.

Japanese Patent No. 3540485 discusses the following technology. That is, according to the technology discussed in Japanese Patent No. 3540485, image data captured during flash light emission and image data captured during nonflash light emission are compared with each other for each arbitrary object region to calculate a ratio of the data, and a contribution of the flash light is determined based on a value of the ratio. Then, by selecting a white balance control value for each object region according to the determined contribution, white balance control is carried out.

However, the technology discussed in Japanese Patent No. 3540485 deals with the white balance control when the flash light is emitted. Thus, the technology cannot be applied when no flash light is emitted. Further, development processing is carried out after the white balance control value is varied from one object region to another. This may cause other control operations such as color reproduction to be inappropriate with respect to the white balance control value. Further, no correction is carried out for a human face color. As a result, when a human is present in the image data, the face color may not be appropriate.

SUMMARY OF THE INVENTION

The present invention is directed to generation of image data where a color of a predetermined region such as a human face color is appropriate.

According to an aspect of the present invention, an image processing apparatus includes a first correction value determination unit configured to determine a first white balance correction value corresponding to a first light source in captured image data and a second white balance correction value corresponding to a second light source in the image data, a detection unit configured to detect a predetermined region in the captured image data, a correction amount calculation unit configured to calculate a correction amount corresponding to the predetermined region, a second correction value determination unit configured to determine a third white balance correction value by correcting the second white balance correction value based on the correction amount, a generation unit configured to generate first image data from the image data based on the first white balance correction value, and second image data from the image data based on the third white balance correction value, and a combining unit configured to combine the first image data and the second image data.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 is a graph used for white detection.

FIG. 14 illustrates a WB correction value in a still image capturing driving mode and a WB correction value in an electronic viewfinder (EVF) imaging driving mode.

DESCRIPTION OF THE EMBODIMENTS

Various exemplary embodiments, features, and aspects of the invention will be described in detail below with reference to the drawings.

Figure 1:
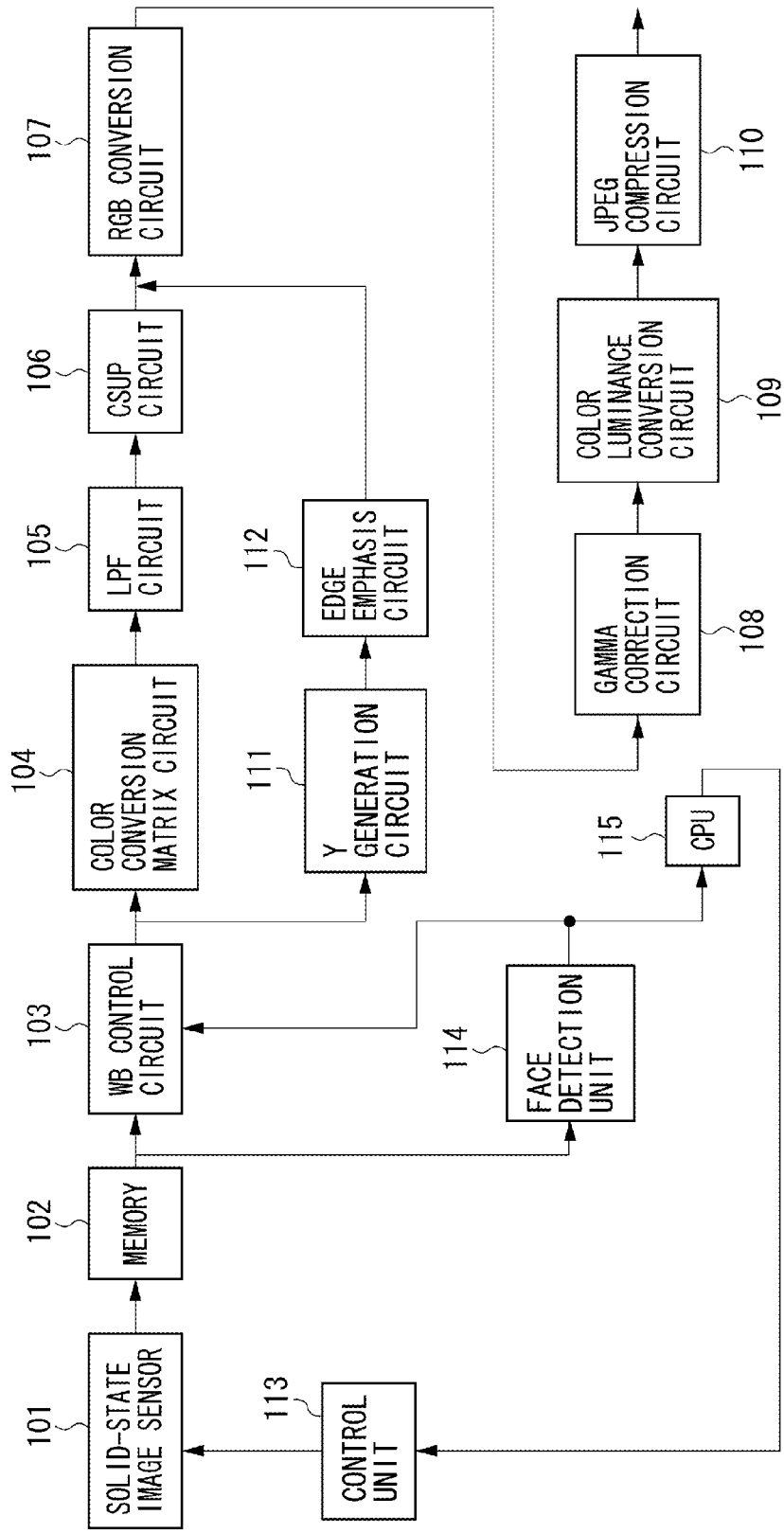
FIG. 1 illustrates a configuration of an imaging apparatus according to a first exemplary embodiment of the present invention.

FIG. 1 illustrates a configuration of an imaging apparatus according to a first exemplary embodiment of the present invention. In FIG. 1, a solid-state image sensor 101 includes a charge-coupled device (CCD) or a complementary metal-oxide semiconductor (CMOS), has its surface covered with red (R), green (G), and blue (B) color filters such a Bayer array, and can carry out color photographing. The imaging apparatus illustrated in FIG. 1 is an application example of an image processing apparatus.

A central processing unit (CPU) 115 calculates a shutter speed and an aperture value for enabling entire image data to be bright, and calculates a driving amount of a focus lens to focus on an object present in an in-focus region. Then, the exposure value (shutter speed and aperture value) and the driving amount of the focus lens calculated by the CPU 115 are output to a control circuit 113, and each component is controlled based on each value. A white balance (WB) control circuit 103 calculates a WB correction value based on the image data stored in a memory 102, and executes WB correction for the image data stored in the memory 102 by using the calculated WB correction value. A method for calculating the WB correction value by the WB control circuit 103 will be described in detail below.

A color conversion matrix circuit 104 adds color gains to the image data WB-corrected by the WB control circuit 103 to reproduce the image data with optimal colors, and converts the image data into color difference signals R-Y and B-Y. A low-pass filter (LPF) circuit 105 limits bands of the color difference signals R-Y and B-Y. A chroma suppress (CSUP) circuit 106 suppresses a false color signal of a saturated portion of the image data band-limited by the LFP circuit 105. The image data WB-corrected by the WB control circuit 103 is also output to a luminance signal (Y) generation circuit 111 to generate a luminance signal Y. An edge emphasis circuit 112 executes edge emphasis processing for the generated luminance signal Y.

An RGB conversion circuit 107 converts the color difference signals R-Y and B-Y output from the CSUP circuit 106 and the luminance signal Y output from the edge emphasis circuit 112 into RGB signals. A gamma (γ) correction circuit 108 executes gradation correction for the converted RGB signals. Then, a color luminance conversion circuit 109 converts the gradation-corrected RGB signals into YUV signals. A Joint Photographic Experts Group (JPEG) compression circuit 110 compresses the YUV signals to record them as image data in an external recording medium or an internal recording medium.

Next, calculation processing of a WB correction value carried out by the WB control circuit 103 will be described in detail. First, a method for determining a first white balance correction value (first WB correction value) for a first light will be described. The first WB correction value is determined by using a value predetermined for each light source. That is, for this value, a value calculated beforehand by photographing white under each light source is used. For example, a scene is determined to estimate a light source. For example, when the light source is determined to be a mercury lamp, a WB correction value determined beforehand for the mercury lamp is used as a first WB correction value. In this case, when a plurality of types of light sources are present, the first WB correction value can be varied from one type to another. For example, when two types of mercury lamps are present, the WB correction value can be varied between the mercury lamps.

Figure 2:
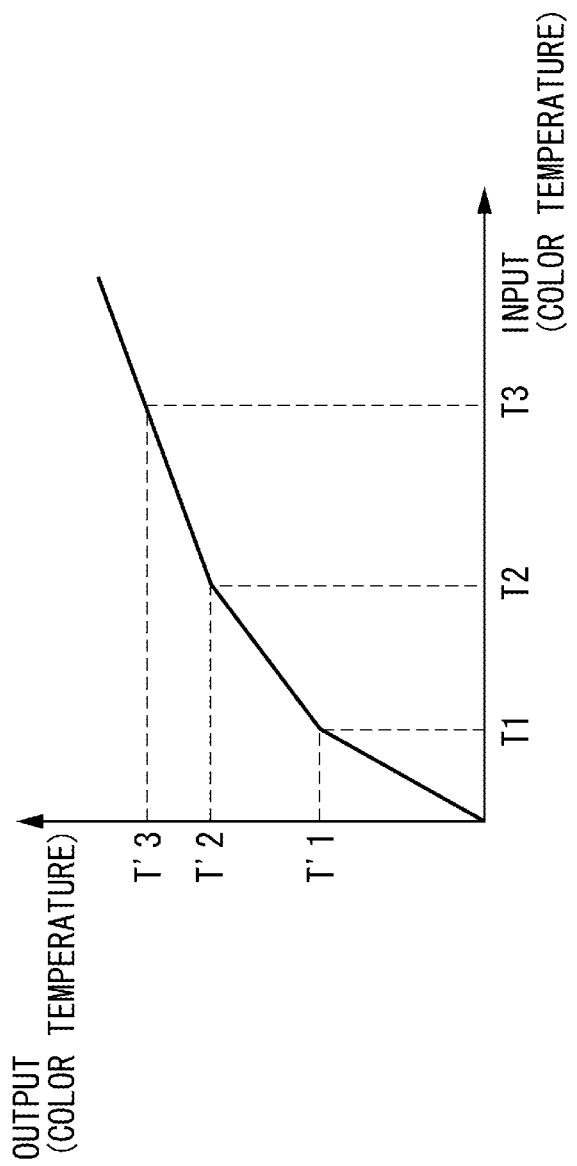
FIG. 2 illustrates a method for calculating a first white balance (WB) correction value to leave a color in view of an atmosphere of a scene.

When in a scene for emitting flash light, a background is illuminated with a low color temperature light source such as an incandescent light bulb light source, the first WB correction value can be calculated to leave a color in view of an atmosphere of the scene. For example, based on a relationship illustrated in FIG. 2, color temperatures are varied between input image data and output image data. Thus, when the color temperature of the first WB correction value is low (e.g., T1 of input), by executing control to leave a color (e.g., T'1 of output), for example, image data that leaves a red color of the bulb color light source can be generated.

Figure 3:
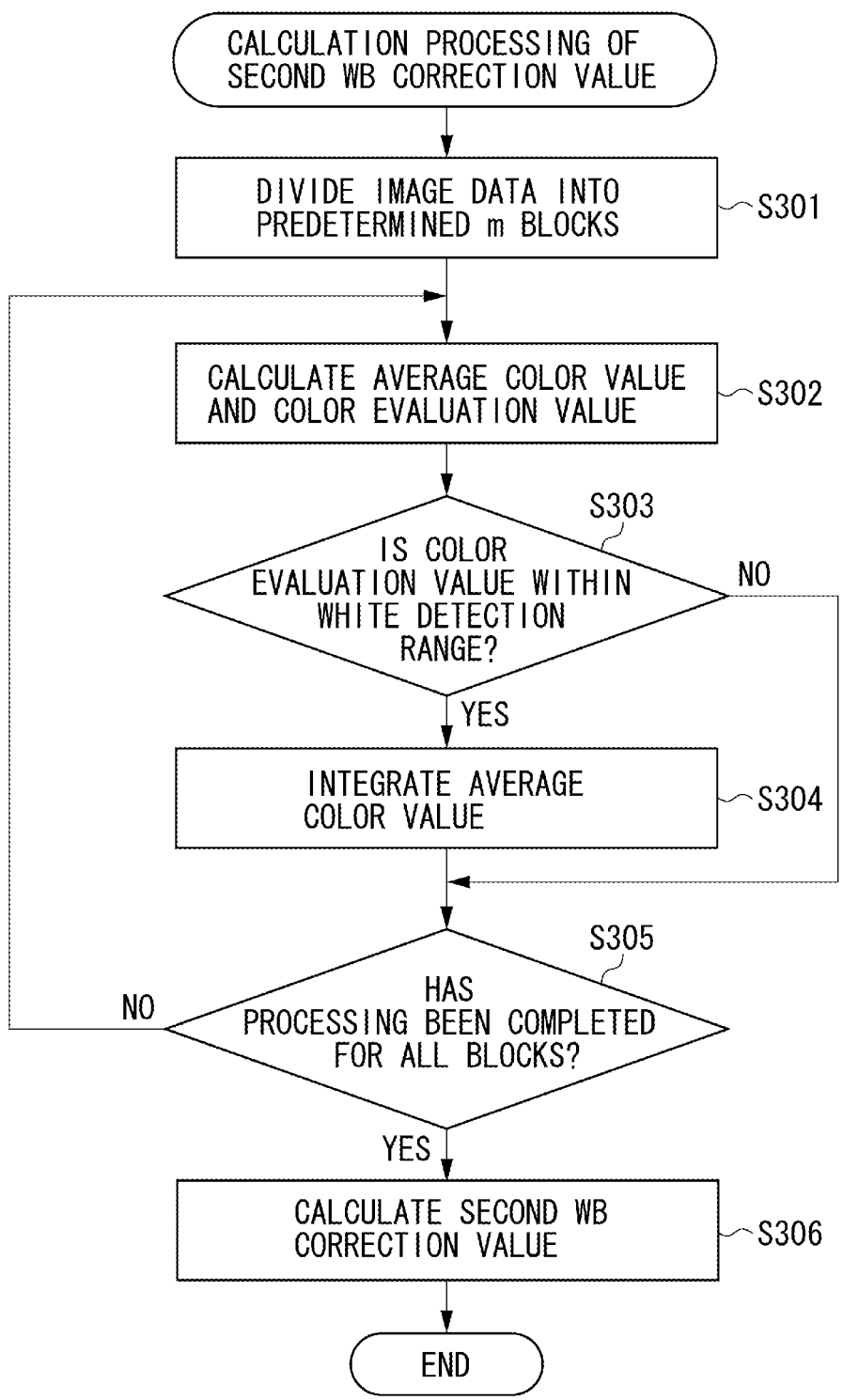
FIG. 3 is a flowchart illustrating calculation processing of a second WB correction value carried out by a WB control circuit according to the first exemplary embodiment.

Next, referring to the flowchart of FIG. 3, calculation processing of a second WB correction value carried out by the WB control circuit 103 according to the first exemplary embodiment will be described in detail. This processing is for calculating a WB correction value based on white balance control using a blackbody locus.

In step S301, the WB control circuit 103 reads the image data stored in the memory 102, and divides the image data into predetermined m blocks. In step S302, the WB control circuit 103 adds and averages pixel values for respective colors for blocks (1 to m) to calculate average color values (R[i], G[i], B[i]), and calculates a color evaluation value (Cx[i], Cy[i]) by using the following expressions:

$$Cx[i]=(R[i]-B[i])/Y[i] \times 1024$$

$$Cy[i]=(R[i]+B[i]-2G[i])/Y[i] \times 1024$$

where Y[i]=(R[i]+2G[i]+B[i])/4.

In step S303, the WB control circuit 103 executes white detection by using a graph having coordinate axes similar to those illustrated in FIG. 4. A negative direction of the x coordinate (Cx) represents a color evaluation value when a white object is photographed with a high color temperature light source, while a positive direction thereof represents a color evaluation value when a white object is photographed with a low color temperature light source. The y coordinate (Cy) indicates a degree of a green component in a light source, and the green component is larger toward a negative direction of the y coordinate, which indicates a fluorescent lamp.

In step S303, the WB control circuit 103 determines whether the color evaluation value (Cx[i], Cy[i]) of an i-th block calculated in step S302 is within a preset white detection range 401 illustrated in FIG. 4. The white detection range 401 is set by photographing a white object under different light sources and plotting calculated color evaluation values. The white detection range can be set according to a photographing mode. When the color evaluation value (Cx[i], Cy[i]) of the i-th block is within the preset white detection range 401 (YES in step S303), the processing proceeds to step S304. On the other hand, when the color evaluation value (Cx[i], Cy[i]) of the i-th block is not within the preset white detection range 401 (NO in step S303), the processing skips step S304 to proceed to step S305.

In step S304, the WB control circuit 103 determines that the i-th block is white to integrate the average color values (R[i], G[i], B[i]) of the block. The processing of steps S303 and S304 can be represented by the following expressions:

$$\text{Sum}R = \sum_{i=0}^{m} Sw[i] \times R[i]$$

$$\text{Sum}G = \sum_{i=0}^{m} Sw[i] \times G[i]$$

$$\text{Sum}B = \sum_{i=0}^{m} Sw[i] \times B[i]$$

In the expressions, when the color evaluation value (Cx[i], Cy[i]) is within the white detection range 401, Sw[i] is set to 1. When the color evaluation value (Cx[i], Cy[i]) is not within the white detection range 401, Sw[i] is set to 0. Accordingly, in steps S303 and S304, whether to integrate the average color values (R[i], G[i], B[i]) is substantially determined.

In step S305, the WB control circuit 103 determines whether the processing has been completed for all the blocks. When not completed (NO in step S305), the processing returns to step S302 to be repeated. On the other hand, when completed (YES in step S305), the processing proceeds to step S306.

In step S306, the WB control circuit 103 calculates a second WB correction value (WBCo1_R2, WBCo1_G2, WBCo1_B2) by using integrated values (SumR, SumG, SumB) of the acquired color evaluation value:

$$WBCo1\_R2 = \text{Sum}Y \times 1024 / \text{Sum}R$$

$$WBCo1\_G2 = \text{Sum}Y \times 1024 / \text{Sum}G$$

$$WBCo1\_B2 = \text{Sum}Y \times 1024 / \text{Sum}B$$

where Sum_Y=(SumR+2×SumG+SumB)/4.

Figure 5:
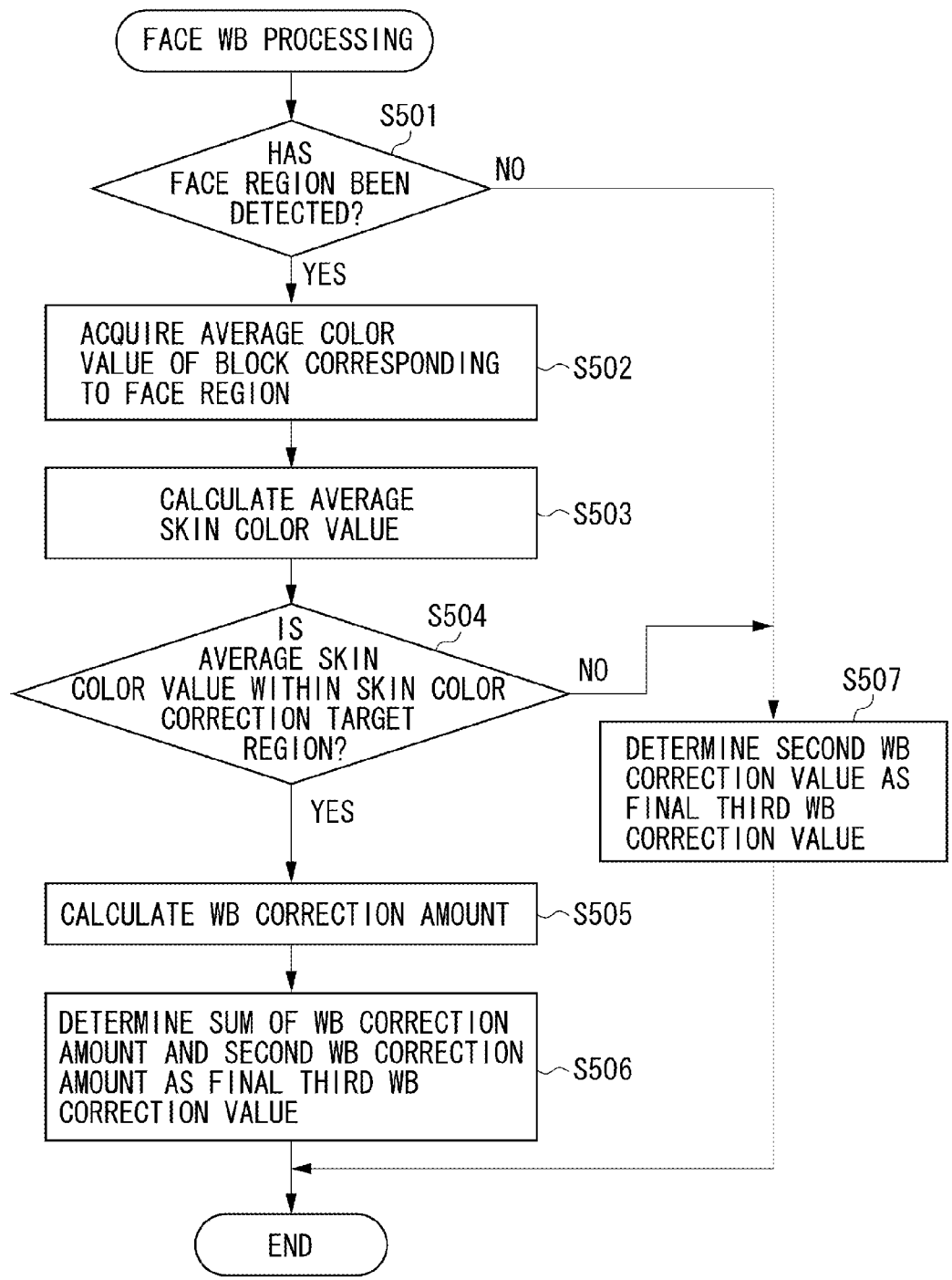
FIG. 5 is a flowchart illustrating calculation processing of a final WB correction value carried out by the WB control circuit according to the first exemplary embodiment.

Next, referring to the flowchart of FIG. 5, calculation processing of a final WB correction value carried out by the WB control circuit 103 will be described.

In step S501, the WB control circuit 103 determines whether a face region has been detected. In this case, an appropriate face region to be detected is image data of a WB correction target. However, a face region can be detected from other image data captured before. When detected (YES in step S501), the processing proceeds to step S502. On the other hand, when not detected (NO in step S501), the processing proceeds to step S507. In step S507, the WB control circuit 103 determines the calculated second WB correction value as a final third WB correction value. Then, the calculation processing of the WB correction value is ended.

In step S502, the WB control circuit 103 acquires average color values (FR, FG, FB) for all blocks (e.g., blocks entirely included in the face region) corresponding to the face region. When no face region is detected in all the blocks, not only the blocks completely included in the face region but also blocks a predetermined percentage of which (e.g., 50% or more) is within the face region can be included corresponding to the face region.

In step S503, the WB control circuit 103 multiplies the average color values (FR, FG, FB) acquired in step S502 by the second WB correction value (WBCo1_R2, WBCo1_G2, WBCo1_B2) to calculate an average skin color value. The average skin color value is a value acquired by correcting the average color value of the face region by the second WB correction value, and an example of a skin color evaluation value. Specifically, the average skin color value (SR, SG, SB) is calculated by the following expressions:

$$SR = FR \times WBCo1\_R2$$

$$SG = FG \times WBCo1\_G2$$

$$SB = FR \times WBCo1\_B2$$

In step S504, the WB control circuit 103 determines whether the average skin color value (SR, SG, SB) is within the WB correction target region.

Figure 6:
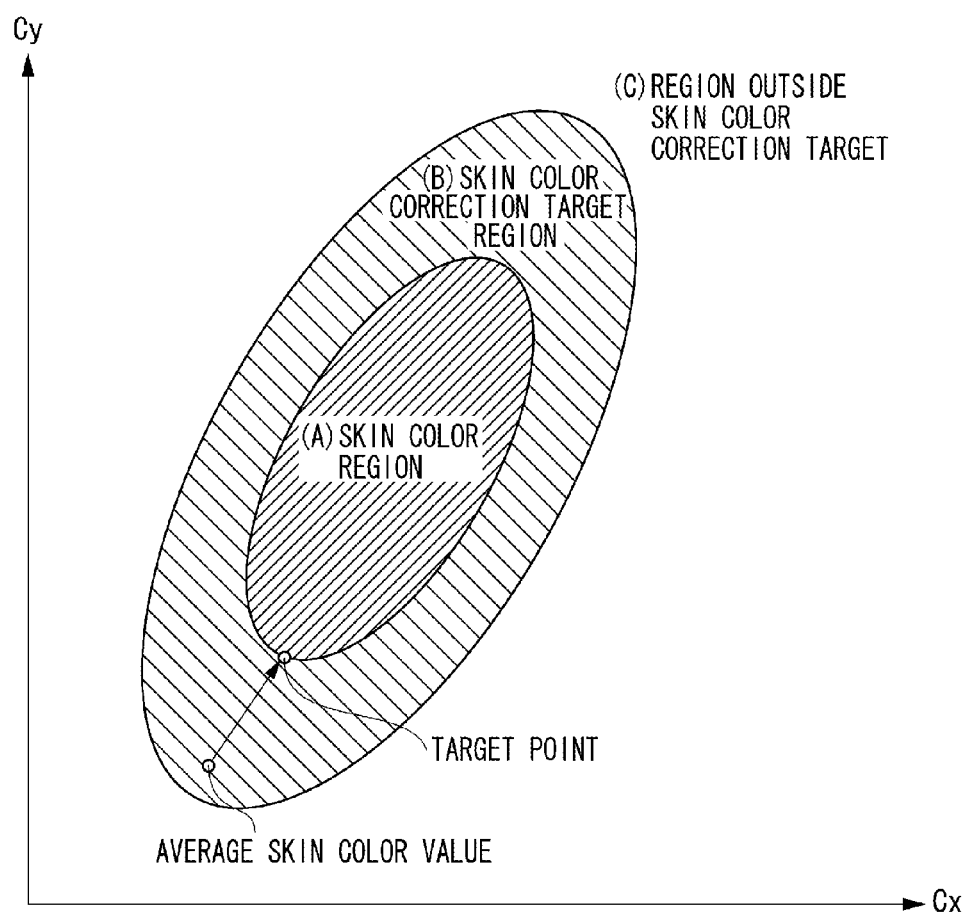
FIG. 6 illustrates an example of a skin color region, a skin color correction target region, and a region outside a skin color correction target.

FIG. 6 illustrates an example of a skin color region, a skin color correction target region, and a region outside the skin color correction target. In FIG. 6, a skin color region (A) corresponds to a first color signal region, and a skin color correction target region (B) corresponds to a second color signal region as a peripheral region where shifting from the first color signal region is within a predetermined range. In FIG. 6, since a Cx and Cy coordinate system is used as a predetermined space coordinate system, the WB control circuit 103 converts RGB data into color difference signals of Cx=SR−SB and Cy=SR+SB−2SG to execute determination. Needless to say, by applying a known color space conversion method, the WB control circuit 103 can execute determination in an arbitrary color space. The skin color region (A) and the skin color correction target region (B) can be set, for example, by photographing a plurality skin colors under white light such as solar light (daylight) and using a statistical method. Information to identify the skin color region (A) and the skin color correction target region (B) can be stored beforehand in the WB control circuit 103 or stored in another storage device to be referred to by the WB control circuit 103 when necessary.

When the average skin color value is within the skin color region (A) illustrated in FIG. 6, it can be determined that the skin color has appropriately been corrected for WB based on the second WB correction value. Thus, in step S507, the WB control circuit 103 determines the second WB correction value as a finally used third WB correction value. When the average skin color value is within the region (C) outside the skin color correction target, in step S507, the WB control circuit 103 determines that the average skin color value does not represent a human skin, and determines the second WB correction value as a finally used third WB correction value. On the other hand, when the average skin color value is within the skin color correction target region (B), it can be determined that the skin color has not appropriately been corrected for WB based on the second WB correction value. Thus, in step S505, the WB control circuit 103 calculates a WB correction amount used for correcting deviation between the average skin color value and the skin color region (A).

Figure 7:
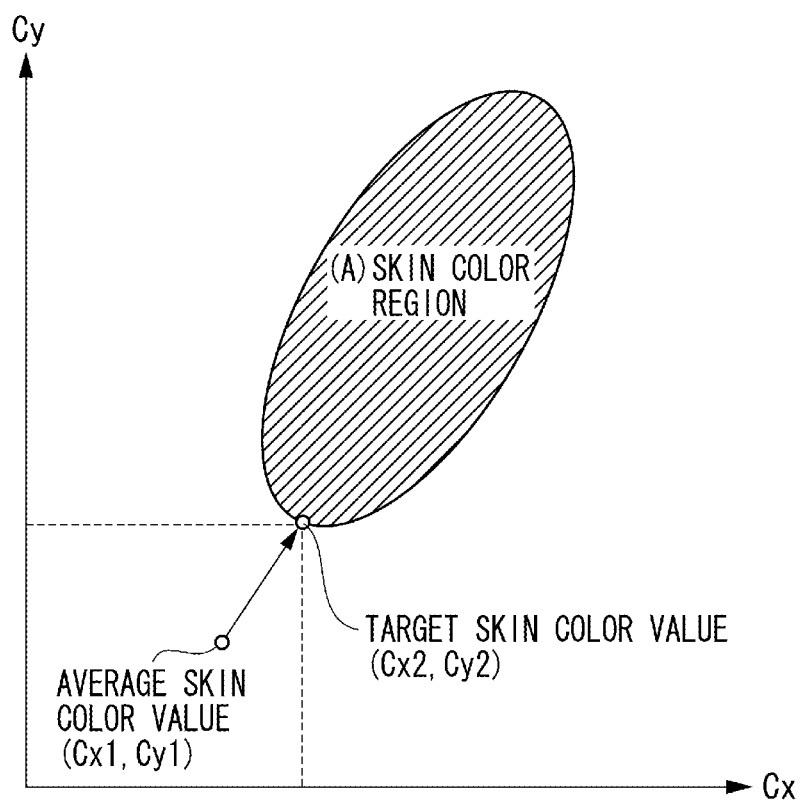
FIG. 7 illustrates a method for calculating a correction value where a moving distance from an average skin color value to the skin color region is shortest.

In this case, as illustrated in FIG. 7, it is assumed that a correction amount where a moving distance from the average skin color value to the skin color region (A) is smallest is calculated. Specifically, the WB control circuit 103 calculates, by using coordinates (Cx1, Cy1) of the average skin color value and coordinates (Cx2, Cy2) of a point (target skin color value) within the skin color region (A) and nearest to the average skin color value, the correction amount by the following expressions:

$$\Delta Cx = Cx2 - Cx1$$

$$\Delta Cy = Cy2 - Cy1$$

The WB control circuit 103 sets the correction amount (ΔCx, ΔCy) as a WB correction amount ΔFW. The use of the coordinates where the moving distance from the average skin color value to the skin color region (A) is smallest is an example of control for maintaining the correction amount within an appropriate skin color range even when correction based on the second WB correction value is excessive. Accordingly, the target skin color value can be set within the skin color region (A). Further, to achieve an appropriate background color, the WB correction amount ΔFW can be changed (e.g., reduced) based on a predetermined parameter α. Specifically, the WB control circuit 103 calculates the WB correction amount ΔFW by the following expressions:

$$\Delta Cx = (Cx2 - Cx1) \times \alpha$$

$$\Delta Cx = (Cy2 - Cy1) \times \alpha$$

where $0 \leq \alpha \leq 1$.

The parameter α can be determined based on the amount of light of the light source applied to a main object present in the image data. For example, the WB control circuit 103 calculates an irradiation amount of the mercury lamp based on a luminance value of a human irradiated with light from the mercury lamp to determine the parameter α. In step S506, the WB control circuit 103 determines a sum of the WB correction amount ΔFW thus calculated and the second WB correction value as a third WB correction value finally used therein. Then, the WB control circuit 103 executes WB control by using the third WB correction value thus determined.

Figure 8:
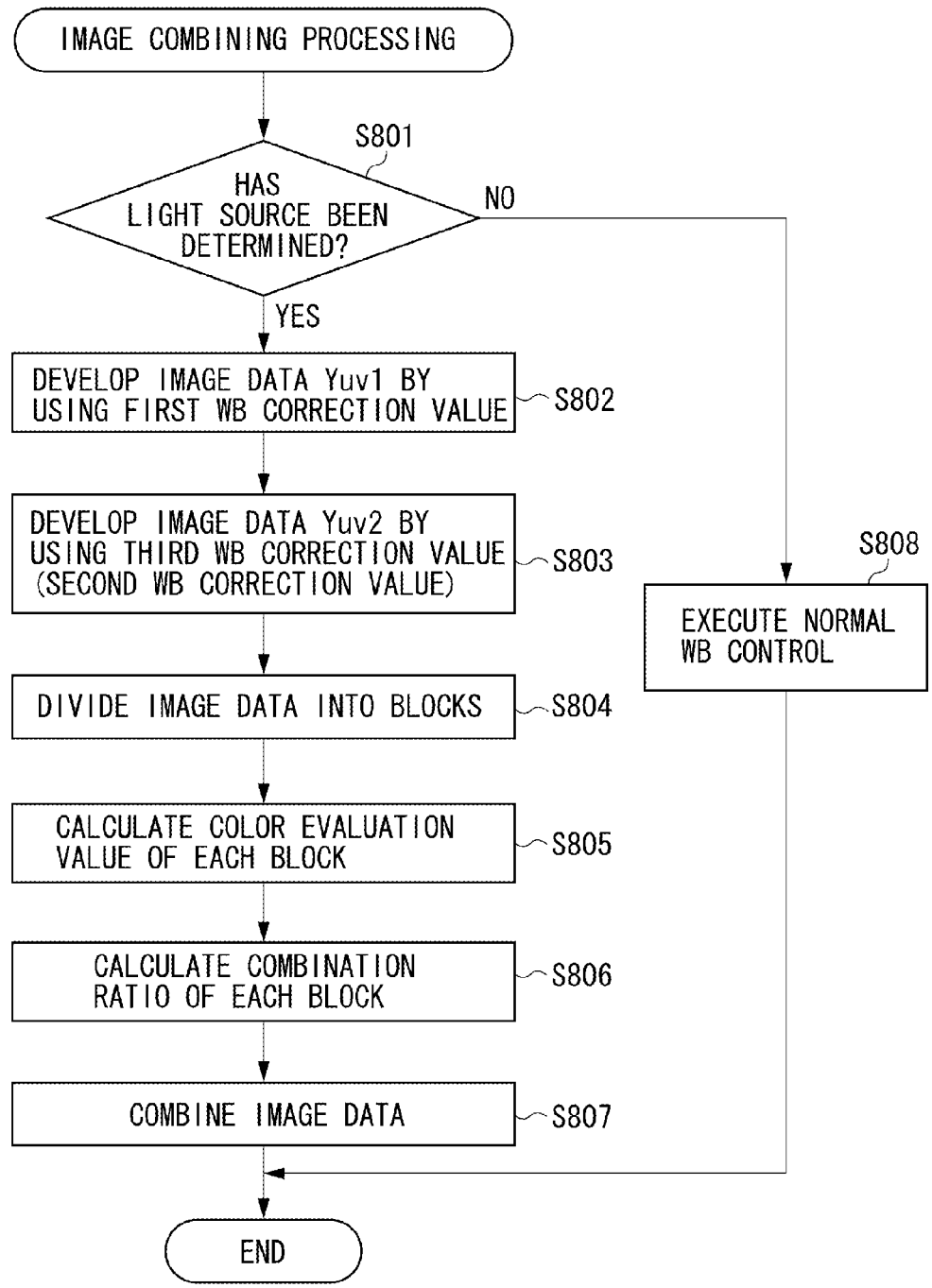
FIG. 8 is a flowchart illustrating combining processing of image data carried out by the WB control circuit according to the first exemplary embodiment.

Next, referring to the flowchart of FIG. 8, combining processing of the image data carried out by the WB control circuit 103 according to the first exemplary embodiment will be described.

In step S801, the WB control circuit 103 determines a scene for the image data stored in the memory 102 to determine whether a light source has been determined. When no light source has been determined (NO in step S801), the processing proceeds to step S808. Accordingly, the WB control circuit 103 carries out normal WB control by using the second WB correction value without combining the image data. On the other hand, when a light source has been determined (YES in step S801), the processing proceeds to step S802, and the WB control circuit 103 combines the image data.

In step S808, the WB control circuit 103 executes the normal WB control by using the second WB control value. In step S802, the WB control circuit 103 generates development image data Yuv1 from the image data (image data during real exposure) recorded in the memory 102 by using first WB correction value corresponding to the light source determined in step S801. In step S803, the WB control circuit 103 generates development image data Yuv2 from the image data (image data during the real exposure) recorded in the memory 102 by using the third WB correction value (second WB correction value). In step S804, the WB control circuit 103 divides each of the image data during the real exposure, the development image data Yuv1, and the development image data Yuv2 into n blocks.

In step S805, the WB control circuit 103 adds and averages pixel values for the respective colors for the respective blocks (1 to n) of the image data during the real exposure to calculate average color values (R[i], G[i], B[i]). In this case, when a saturated pixel is present, a pixel value of the saturated pixel and a pixel value of a pixel of another color corresponding to the saturated pixel do not need to be included in addition processing. For example, when a certain R pixel is a saturated pixel, a pixel value of the R pixel, and a pixel value of a G pixel and a pixel value of a B pixel corresponding to the R pixel are not included in the addition processing.

In step S806, the WB control circuit 103 sets an evaluation frame and an inner frame described below according to each light source, and calculates a combination ratio (Mix ratio) of each block based on a difference between the second WB correction value and the color evaluation value of each block.

Figure 9:
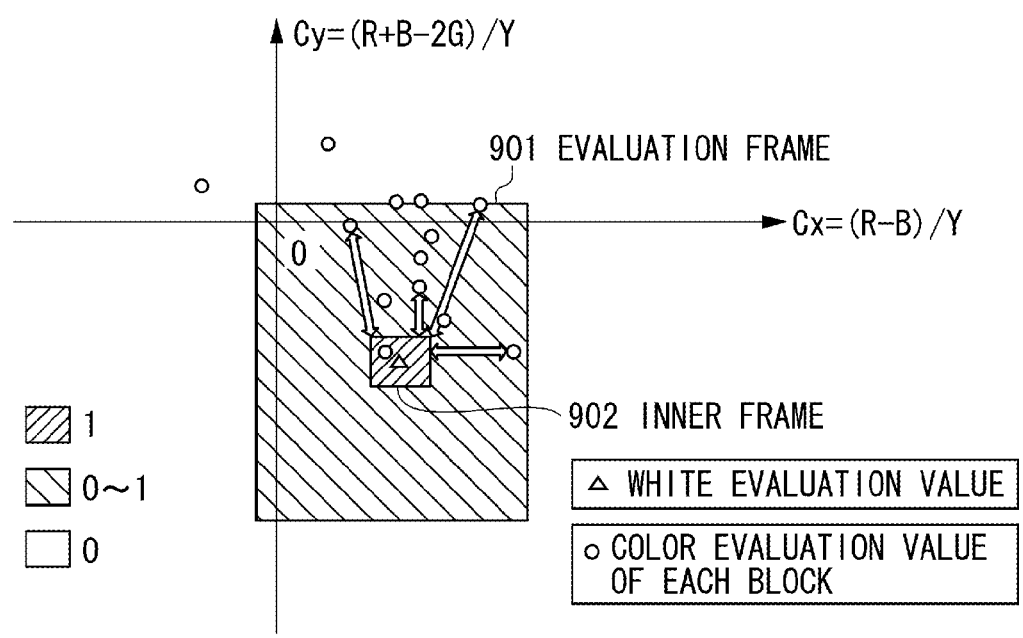
FIG. 9 illustrates an evaluation frame and an inner frame for a mercury lamp.
Figure 10:
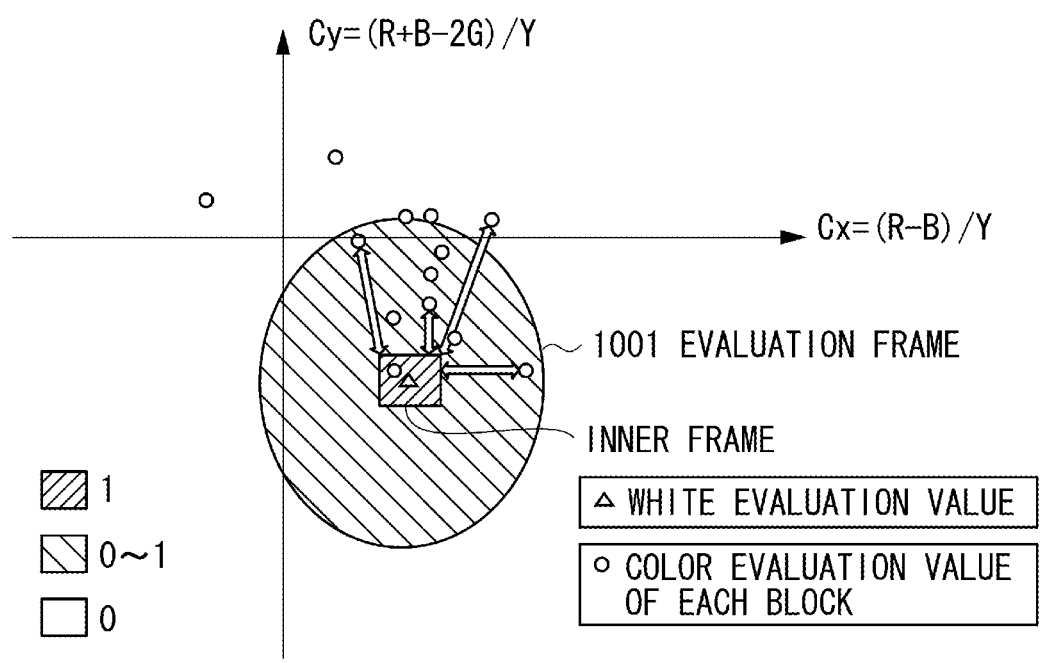
FIG. 10 illustrates another example of an evaluation frame and an inner frame for the mercury lamp.
Figure 11:
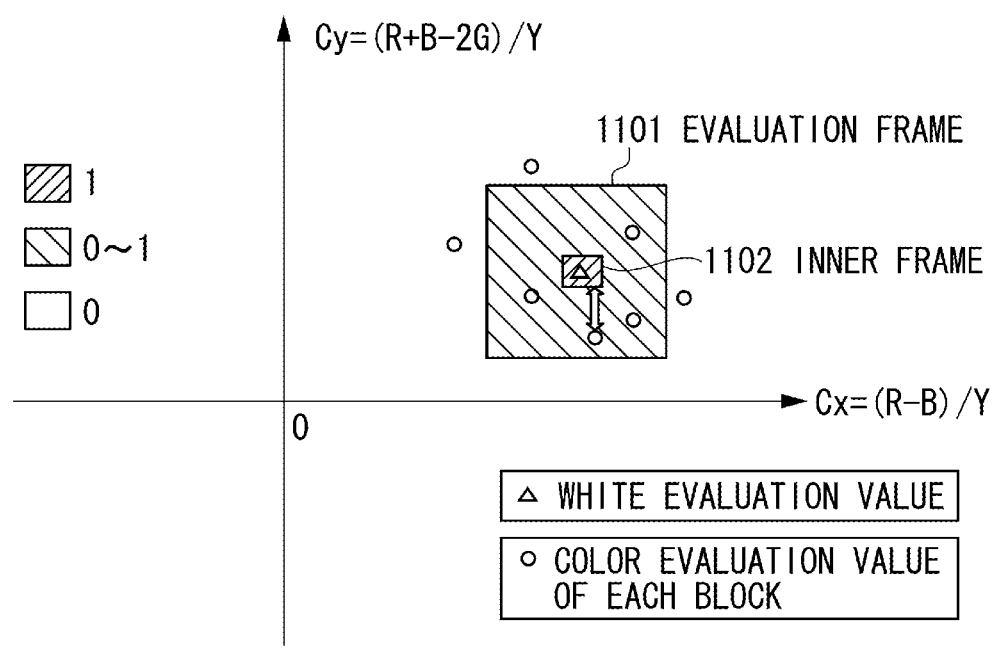
FIG. 11 illustrates an evaluation frame and an inner frame for a bulb color light source.

For example, in a scene using a mercury lamp, as illustrated in FIG. 9, the WB control circuit 103 sets an evaluation frame 901 and an inner frame 902 for the mercury lamp by using, as a center of gravity, a predetermined white evaluation value under the mercury lamp. Then, the WB control circuit 103 calculates a combination ratio of each block based on a distance between the predetermined white evaluation value under the mercury lamp and the color evaluation value of each block. The evaluation frame 901 is set based on a color evaluation value calculated beforehand by photographing a white object under the mercury lamp. First, for a block where a difference between the color evaluation value and the white evaluation value under the mercury lamp is small and a color evaluation value is present in the inner frame 902 illustrated in FIG. 9, the WB control circuit 103 sets a combination ratio α[i] of the block to 1. Then, for a block where a color evaluation value is present in a region between the inner frame 902 and the evaluation frame 901 illustrated in FIG. 9, the WB control circuit 103 linearly reduces a combination ratio from the inner frame 902 to the evaluation frame 901 to set the inner frame 902 to combination ratio α[i]=1 and the evaluation frame 901 to combination ratio α[i]=0, and calculates a combination ratio α[i] of the block. Outside the evaluation frame 901, the WB control circuit 103 sets a combination ratio α[i] to 0. The evaluation frame 901 and the inner frame 902 can be formed into arbitrary shapes in place of square shapes. For example, as illustrated in FIG. 10, an evaluation frame 1001 can be formed into an elliptical (circular) shape. Further, for example, even in a scene that uses a low color temperature light source such as a bulb light source, an evaluation frame 1101 and an inner frame 1102 illustrated in FIG. 11 are set. Then, a combination ratio can be calculated by executing processing similar to the combination ratio calculation method in the scene under the mercury lamp. Thus, in step S806, the combination ratio calculation is carried out for each block.

In step S807, the WB control circuit 103 combines the development image data Yuv1 and the development image data Yuv2 by using the combination ratio α[i] of each block to generate combined image data Yuv3. A color evaluation value (Y3[i], u3[i], v3[i]) of the combined image data Yuv3 is calculated by the following expressions using a color evaluation value (Y1[i], u1[i], v1[i]) of the development image data Yuv1 and a color evaluation value (Y2[i], u2[i], v2[i]) of the development image data Yuv2:

$$Y3[i] = Y1[i] * \alpha[i] + Y2[i] * (1 - \alpha[i])$$

$$u3[i] = u1[i] * \alpha[i] + u2[i] * (1 - \alpha[i])$$

$$v3[i] = v1[i] * \alpha[i] + v2[i] * (1 - \alpha[i])$$

To reduce color shifting generated on a boundary portion of the blocks, by executing pixel interpolation processing in step S806, the WB control circuit 103 can calculate a combination ratio α'[j] for each pixel from the combination ratio α[i] of each block. For example, the WB control circuit 103 calculates the combination ratio α'[j] for each pixel from the combination ratio α[i] of each block by using bilinear interpolation as pixel interpolation processing. In step S807, the WB control circuit 103 combines the development image data Yuv1 and the development image data Yuv2 by using the combination ratio α'[j] for each pixel to generate combined image data Yuv3.

A color evaluation value (Y3[j], u3[j], v3[j]) of the combined image data Yuv3 is calculated by the following expressions using a color evaluation value (Y1[j], u1[j], v1[j]) of the development image data Yuv1 and a color evaluation value (Y2[j], u2[j], v2[j]) of the development image data Yuv2:

$$Y3[i]=Y1[i]*\alpha'[i]+Y2[i]*(1-\alpha'[i])$$

$$u3[i]=u1[i]*\alpha'[i]+u2[i]*(1-\alpha'[i])$$

$$v3[i]=v1[i]*\alpha'[i]+v2[i]*(1-\alpha'[i])$$

In the combining processing of the image data, to reduce the amount of calculation at the WB control circuit 103, only the u component and the v component (color components) can be combined. Specifically, the WB control circuit 103 calculates the color evaluation value by the following expressions in the combining processing of the image data:

$$Y3[i]=Y1[i]$$

$$u3[i]=u1[i]*\alpha[i]+u2[i]*(1-\alpha[i])$$

$$v3[i]=v1[i]*\alpha[i]+v2[i]*(1-\alpha[i])$$

In the combining processing of the image data, the Yuv form is used for the development image data. However, other forms can be used. For example, when an RGB form is used as a development image data form, in place of the expressions used in step S807, the following expressions are used. That is, the WB control circuit 103 calculates a color evaluation value (R1[$i$], G1[$i$], B1[$i$]) of development image data RGB1 developed by using the first WB correction value and a color evaluation value (R2[$i$], G2[$i$], B2[$i$]) of development image data RGB2 developed by using the second WB correction value. Then, the WB control circuit 103 calculates a color evaluation value (R3[$i$], G3[$i$], B3[$i$]) of combined image data RGB3 by the following expressions:

$$R3[i]=R1[i]*\alpha[i]+R2[i]*(1-\alpha[i])$$

$$G3[i]=G1[i]*\alpha[i]+G2[i]*(1-\alpha[i])$$

$$B3[i]=B1[i]*\alpha[i]+B2[i]*(1-\alpha[i])$$

Next, a second exemplary embodiment of the present invention will be described. The second exemplary embodiment is directed to a processing during a flash light emission. The second exemplary embodiment is different from the first exemplary embodiment in a calculation method of WB correction value and a combination ratio calculation method at a WB control circuit 103. Other portions are similar to those of the first exemplary embodiment, and thus detailed description thereof will be omitted. A configuration of an imaging apparatus according to the second exemplary embodiment is similar to that of the imaging apparatus of the first exemplary embodiment illustrated in FIG. 1, and thus description thereof will be omitted.

First, calculation processing of a WB correction value carried out by the WB control circuit 103 according to the second exemplary embodiment will be described. A first WB correction value is a value calculated by WB control corresponding to flash light.

In calculation processing of the first WB correction value, white detection is carried out by a method similar to that of the second WB correction value of the first exemplary embodiment. In this case, within a white detection range for flash light similar to the white detection range 402 illustrated in FIG. 4, the first WB correction value is calculated as in the case of the first exemplary embodiment. It is because the white color range can be limited since the flash light is a known light source. During flash light emission, as the first WB correction value, a WB correction value for flash light can be set beforehand as known.

Figure 13:
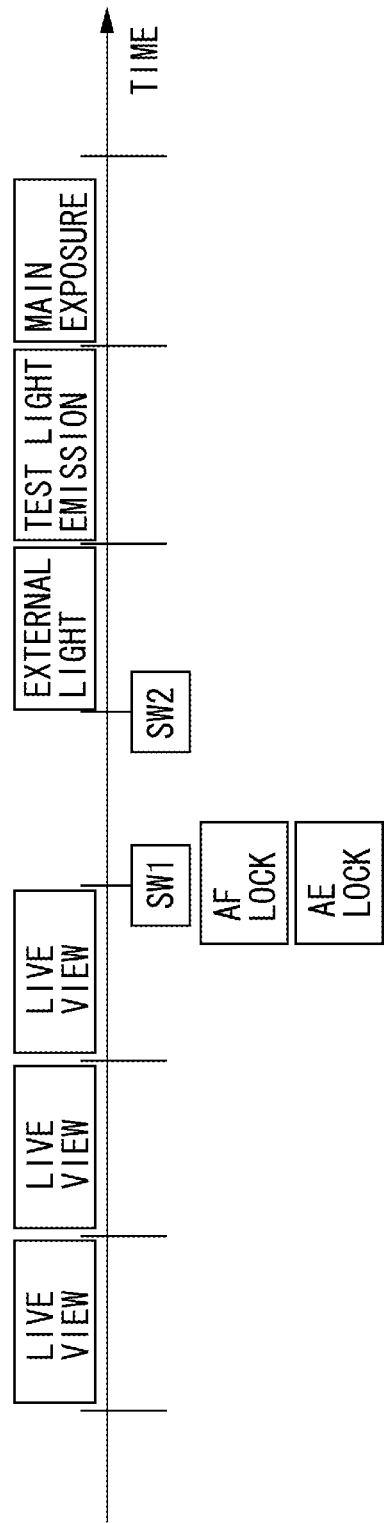
FIG. 13 illustrates a state where photographing control operations are arranged in time sequence.

Next, calculation processing of a second WB correction value will be described. The second WB correction value is calculated from image data captured in a non-emission state of flash light. FIG. 13 illustrates a state where photographing control operations are arranged in time sequence. As illustrated in FIG. 13, in a state before a shutter button is half-pressed (hereinafter, state of SW1), a live view image is periodically captured, and autofocus (AF) locking and automatic exposure (AE) locking are carried out in the state of the SW1. In a fully-pressed state of the shutter button (hereinafter, state of SW2), test light emission and main exposure are carried out. Image data exposed during time represented by "external light" before test light emission and captured is set as image data when no flash light is emitted (hereinafter, flash light non-emission time image data). As the flash light non-emission time image data, image data exposed after main exposure and captured can be used.

The calculation processing of the second WB correction value is carried out by the same method as that of the first WB correction value. However, the calculation processing of the second WB correction value is different from the calculation processing of the first WB correction value in that it is carried out within a white detection range for external light similar to the white detection range 401 illustrated in FIG. 4.

The second WB correction value can be applied even when an imaging driving mode is different. For example, a WB correction value of an electronic viewfinder (EVF) imaging driving mode calculated in the past can be used. However, when a spectral difference is generated due to the imaging driving mode, the WB correction circuit 103 corrects the WB correction value. FIG. 14 illustrates a WB correction value in a still image capturing driving mode and a WB correction value in the EVF imaging driving mode. When a WB correction value in the still image capturing driving mode is calculated by using the WB correction value of the EVF imaging driving mode captured in the past, the WB control circuit 103 corrects a WB correction value (EvfCx, EvfCy) 1401 of the EVF imaging driving mode by ΔCx and ΔCy. Thus, a WB correction value (CapCx, CapCy) in the still image capturing driving mode is calculated.

Then, as in the case of the first exemplary embodiment, the WB control circuit 103 detects a face region, and calculates a WB correction amount ΔFW by using a skin color evaluation value. Then, the WB control circuit 103 adds together the WB correction amount ΔFW and the second WB correction value to calculate a finally used third WB correction value. The calculation method of the third WB correction value is similar to that of the first exemplary embodiment, and thus detailed description thereof will be omitted.

Figure 12:
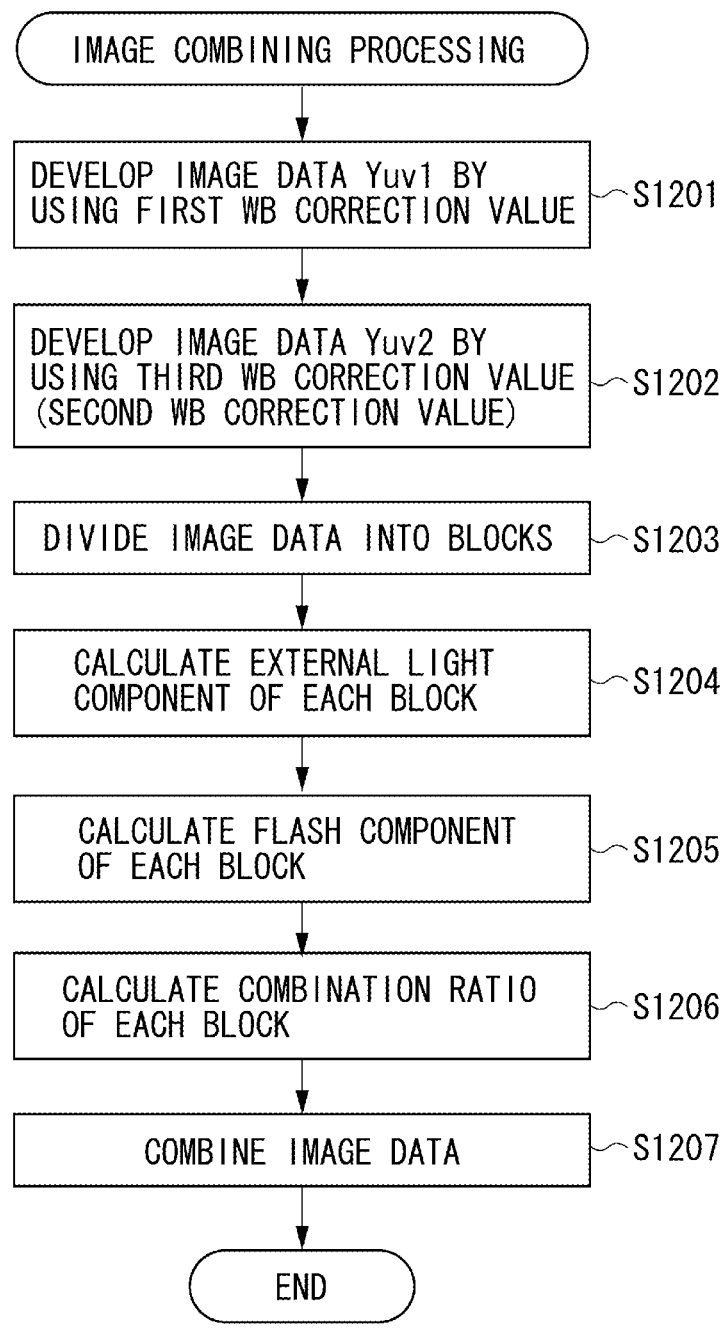
FIG. 12 is a flowchart illustrating combining processing of image data carried out by a WB control circuit according to a second exemplary embodiment.

Next, referring to the flowchart of FIG. 12, combining processing of the image data carried out by the WB control circuit 103 according to the second exemplary embodiment will be described.

In step S1201, the WB control circuit 103 develops image data Yuv1 from the image data during real exposure stored in a memory 102 by using first WB correction value corresponding to flash light. In step S1202, the WB control circuit 103 develops image data Yuv2 from the image data during flash light non-emission time by using the second WB correction value. In step S1203, the WB control circuit 103 divides each of the image data during the real exposure, the flash light non-emission time image data, the image data Yuv1, and the image data Yuv2 into n blocks.

In step S1204, the WB control circuit 103 adds and averages pixel values for the respective colors for the respective blocks (1 to n) of the flash light non-emission time image data to calculate average color values (R1[$i$], G1[$i$], B1[$i$]) and a luminance value a[i] of each block. The luminance value a[i] of each block is calculated by the following expression, where the calculated luminance value a[i] of each block is a luminance component of external light of each block (hereinafter, external light component):

$$a[i]=0.3*R1[i]+0.6*G1[i]+0.1*B1[i]$$

In step S1205, the WB control circuit 103 adds and averages pixel values for the respective colors for the respective blocks (1 to n) of the image data during the main exposure to calculate average color values (R2[i], G2[i], B2[i]) and a luminance value b[i] of each block. The luminance value b[i] of each block is calculated by the following expression:

$$b[i]=0.3*R2[i]+0.6*G2[i]+0.1*B2[i]$$

The WB control circuit 103 calculates, by the following expression, a flash light luminance component (hereinafter, flash component) c[i] for each block by subtracting a luminance value a[i] of each block of corresponding flash light non-emission image data from a calculated luminance value b[i] of each block:

$$c[i]=b[i]-a[i]$$

In step S1206, the WB control circuit 103 calculates, by the following expression, a combination ratio α[i] (Mix ratio) for each block when the image data Yuv1 and the image data Yuv2 are combined based on a ratio of a flash component c[i] for each corresponding block to a external light component a[i]:

$$\alpha[i] = \frac{c[i]}{b[i]+c[i]}$$

In step S1207, the WB control circuit 103 combines the image data Yuv1 and the image data Yuv2 by using the combination ratio α[i] for each block to generate combined image data Yuv3.

According to the above-described exemplary embodiments, in a scene where a plurality of different light sources is present in a mixed state, a desirable image can be provided to the user by generating image data where both the face and the background of the main object have appropriate colors.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., non-transitory computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-195254 filed Sep. 7, 2011, which is hereby incorporated by reference herein in its entirety.

What is claimed is:

1. An image processing apparatus comprising:
   a first correction value determination unit configured to determine a first white balance correction value corresponding to a first light source in captured image data and a second white balance correction value corresponding to a second light source in the image data;
   a detection unit configured to detect a predetermined region in the captured image data;
   a correction amount calculation unit configured to calculate a correction amount corresponding to the predetermined region;
   a second correction value determination unit configured to determine a third white balance correction value by correcting the second white balance correction value based on the correction amount;
   a generation unit configured to generate first image data from the image data based on the first white balance correction value, and second image data from the image data based on the third white balance correction value; and
   a combining unit configured to combine the first image data and the second image data.

2. The image processing apparatus according to claim 1, wherein the correction amount calculation unit is configured to acquire an evaluation value of a predetermined color by applying the second white balance correction value to the predetermined region, and to calculate, when the evaluation value is shifted from a region of the predetermined color, the correction amount so that the evaluation value is within the region of the predetermined color.

3. The image processing apparatus according to claim 1, wherein the correction amount calculation unit is configured to change the correction amount by using a predetermined parameter.

4. The image processing apparatus according to claim 3, wherein the parameter is a value determined based on a light amount of a light source with which a main object present in the image data is irradiated.

5. The image processing apparatus according to claim 1, wherein the first correction value determination unit is configured to determine the first white balance correction value based on a value determined for each light source.

6. The image processing apparatus according to claim 1, wherein the first correction value determination unit is configured to determine the first white balance correction value based on image data captured during flash light emission.

7. The image processing apparatus according to claim 1, wherein the first correction value determination unit is configured to determine the second white balance correction value based on white balance control using a blackbody locus.

8. The image processing apparatus according to claim 1, wherein the first correction value determination unit is configured to determine the second white balance correction value based on image data captured during flash light non-emission.

9. The image processing apparatus according to claim 8, further comprising:
   a component calculation unit configured to calculate a luminous component of external light and a luminous component of flash light based on a luminance value of the image data captured during the flash light non-emission and the image data captured during the flash light emission; and
   a combination ratio calculation unit configured to calculate a combination ratio of the first image data and the second image data based on the luminous component of the external light and the luminous component of the flash light,
wherein the combining unit is configured to combine the first image data and the second image data according to the combination ratio calculated by the combination ratio calculation unit.

10. The image processing apparatus according to claim 9, wherein the combination ratio calculation unit is configured to calculate the combination ratio of the first image data and the second image data based on the luminous component of the external light and the luminous component of the flash light for each block.

11. The image processing apparatus according to claim 1, further comprising a combination ratio calculation unit configured to calculate a combination ratio of the first image data and the second image data based on a difference between a color evaluation value of the image data and a white evaluation value under the second light source,
wherein the combining unit is configured to combine the first image data and the second image data according to the combination ratio calculated by the combination ratio calculation unit.

12. The image processing apparatus according to claim 11, further comprising a color evaluation value calculation unit configured to calculate a color evaluation value of the image data for each block,
wherein the combination ratio calculation unit is configured to calculate the combination ratio for each block based on the difference between the color evaluation value of the image data for each block and a white evaluation value under the second light source.

13. The image processing apparatus according to claim 10, wherein the combination ratio calculation unit is configured to determine a combination ratio for each pixel from the combination ratio for each block by pixel interpolation processing.

14. The image processing apparatus according to claim 12, wherein the color evaluation calculation unit is configured not to include, when calculating the color evaluation value of the image data, a pixel value of a saturated pixel and a pixel value of a pixel of another color corresponding to the saturated pixel in the calculation of the color evaluation value.

15. The image processing apparatus according to claim 1, wherein the first correction value determination unit is configured to calculate the first white balance correction value to leave an arbitrary color with respect to the light source.

16. The image processing apparatus according to claim 1, wherein the combining unit is configured to combine only color components of the first image data and the second image data.

17. An image processing method performed by an image processing apparatus, the image processing method comprising:
determining a first white balance correction value corresponding to a first light source in captured image data and a second white balance correction value corresponding to a second light source in the image data;
detecting a predetermined region in the captured image data;
calculating a correction amount corresponding to the predetermined region;
determining a third white balance correction value by correcting the second white balance correction value based on the correction amount;
generating first image data from the image data based on the first white balance correction value, and second image data from the image data based on the third white balance correction value; and
combining the first image data and the second image data.

18. A non-transitory computer-readable storage medium storing a program that causes a computer to execute a method comprising:
determining a first white balance correction value corresponding to a first light source in captured image data and a second white balance correction value corresponding to a second light source in the image data;
detecting a predetermined region in the captured image data;
calculating a correction amount corresponding to the predetermined region;
determining a third white balance correction value by correcting the second white balance correction value based on the correction amount;
generating first image data from the image data based on the first white balance correction value, and second image data from the image data based on the third white balance correction value; and
combining the first image data and the second image data.

* * * * *